United States Patent
Wynn

(12) 
(10) Patent No.: US 6,512,223 B1
(45) Date of Patent: Jan. 28, 2003

(54) PHOTOMETRIC DETECTOR ASSEMBLY WITH INTERNAL CALIBRATION FILTERS

(75) Inventor: William H. Wynn, Hillsborough, CA (US)

(73) Assignee: Wedgewood Technology, Inc., San Carlos, CA (US)

(*) Notice: Subject to any disclaimer, the term of this patent is extended or adjusted under 35 U.S.C. 154(b) by 92 days.

(21) Appl. No.: 09/690,697

(22) Filed: Oct. 16, 2000

(51) Int. Cl.[7] .............................................. H01J 40/14
(52) U.S. Cl. ....................... 250/239; 250/226; 356/418
(58) Field of Search ................................ 250/239, 226, 250/573, 574, 575, 576; 356/416, 418, 419, 438, 440, 228

(56) References Cited

U.S. PATENT DOCUMENTS

| 4,583,859 A | * | 4/1986 | Hall, II ........................ 250/573 |
| 5,760,911 A | * | 6/1998 | Santsch et al. .............. 356/438 |
| 5,905,271 A | | 5/1999 | Wynn | |

* cited by examiner

*Primary Examiner*—Kevin Pyo
(74) *Attorney, Agent, or Firm*—Edward S. Wright

(57) ABSTRACT

Photometric detector assembly which includes a housing, means for passing an optical beam along a path through the housing to a detector, a NIST traceable calibration filter enclosed within the housing, and means operable externally of the housing for moving the filter into and out of the beam path between calibration and normal operating positions.

15 Claims, 3 Drawing Sheets

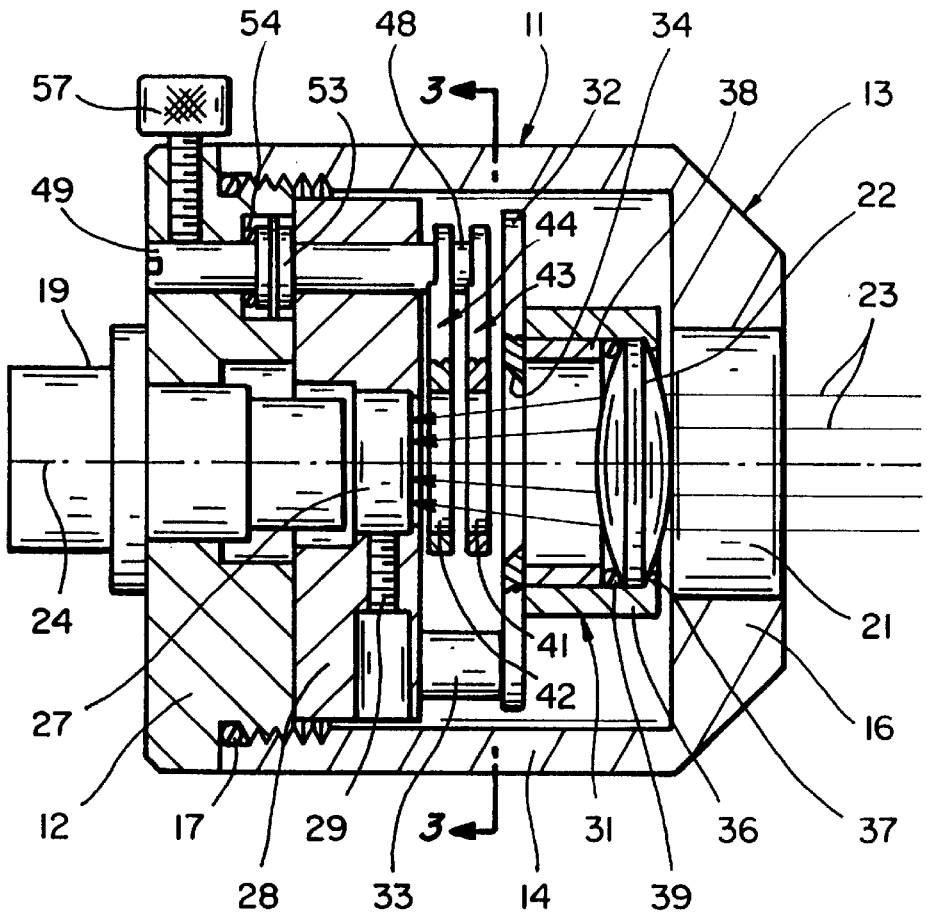
FIG_1
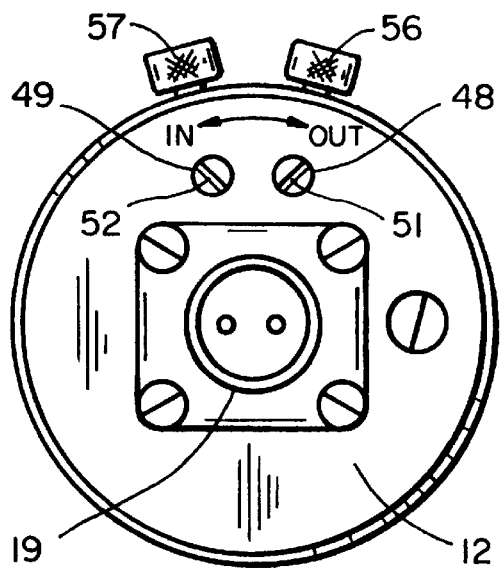
FIG_2

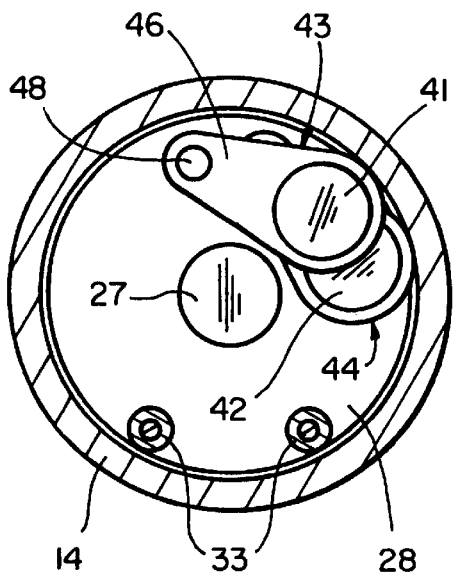
FIG_3A
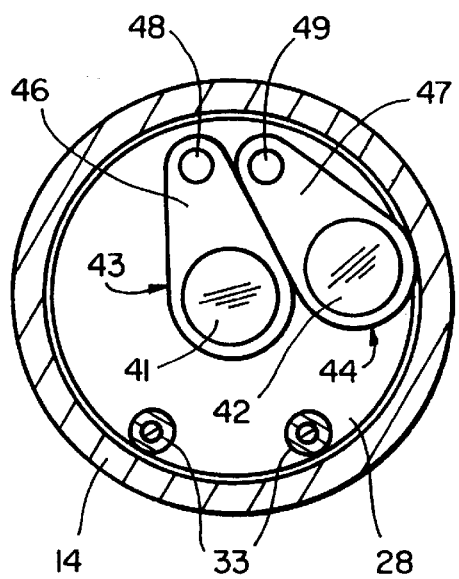
FIG_3B
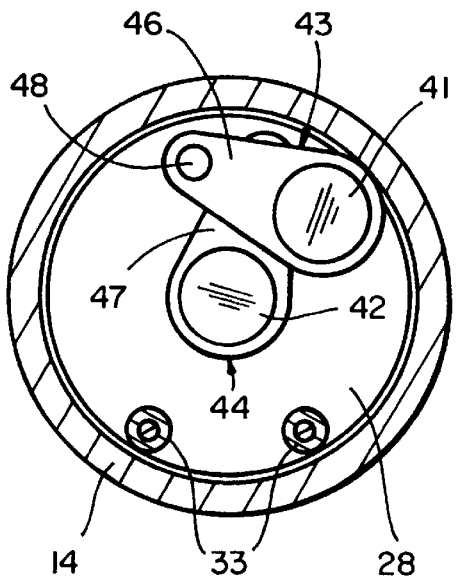
FIG_3C
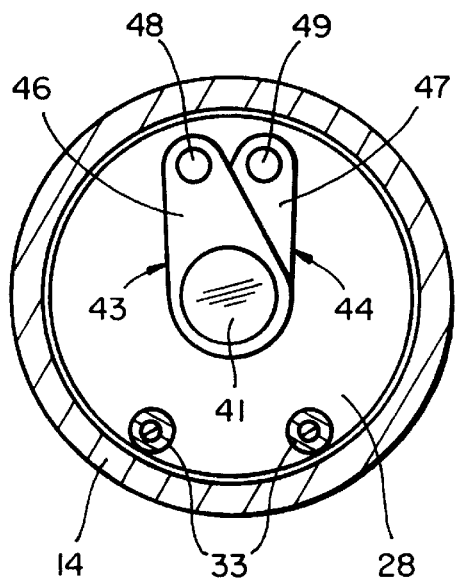
FIG_3D

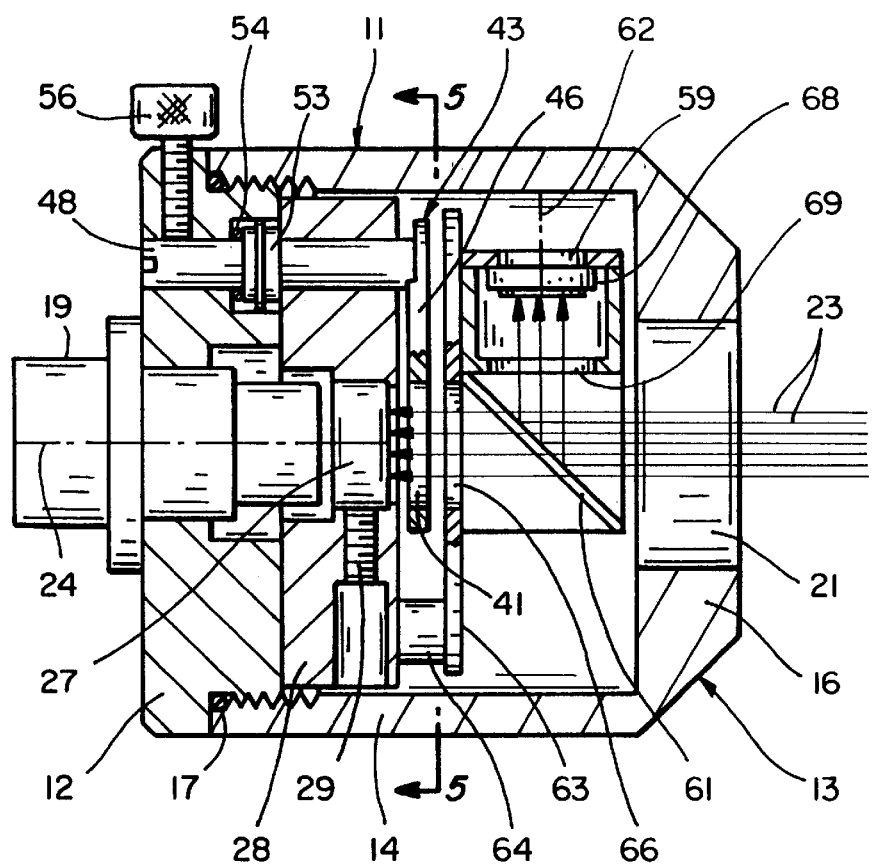
FIG_4
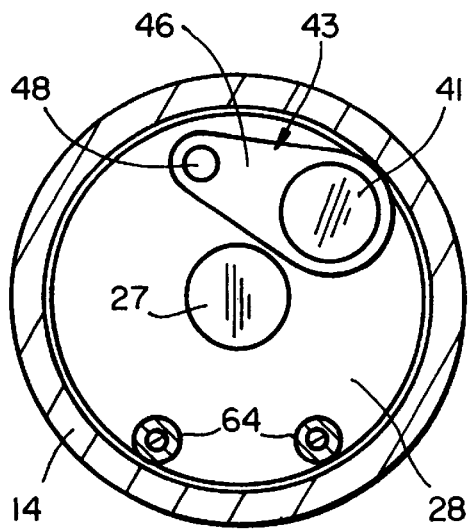
FIG_5A
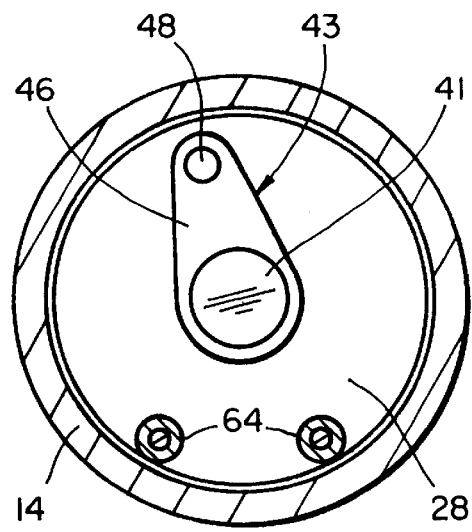
FIG_5B

PHOTOMETRIC DETECTOR ASSEMBLY WITH INTERNAL CALIBRATION FILTERS

BACKGROUND OF THE INVENTION

1. Field of Invention

This invention pertains generally to photometric analyzers and, more particularly, to a photometric detector assembly for use in a photometric analyzer such as an inline optical sensor.

2. Related Art

U.S. Pat. No. 5,905,271 discloses an inline optical sensor which can be utilized in a wide variety of applications (e.g. spectrophotometers, calorimeters, turbidimeters, refractometers, and ultrasonic flow and particle sensing devices) for monitoring photometric the properties of a fluid product stream. Such instruments generally have a light source and a detector positioned on opposite sides of the product stream, with the light source directing a beam of light through the product stream to the detector. The light can be in the ultra violet, visible or near infrared spectrums, and the term light is used herein as including all three.

When inline photometric analyzers are used as a primary measurement source for controlling critical filtration and separation processes, particularly in the biotech and pharmaceutical fields, NIST traceable calibration standards must generally be used in order to comply with validation protocols and procedures. Such standards are typically in the form of filters which are placed between the light source and detector. These filters are subject to deterioration with use and exposure to the environment, and they must be re-certified periodically.

OBJECTS AND SUMMARY

It is in general an object of the invention to provide a new and improved detector assembly for use in a photometric analyzer.

Another object of the invention is to provide a photometric detector assembly of the above character which has internal calibration filters.

These and other objects are achieved in accordance with the invention by providing a photometric detector assembly which includes a housing, means for passing an optical beam along a path through the housing to a detector, a NIST traceable calibration filter enclosed within the housing, and means operable externally of the housing for moving the filter into and out of the beam path between calibration and normal operating positions.

BRIEF DESCRIPTION OF THE DRAWINGS

FIG. 1 is a cross-sectional view of one embodiment of a photometric detector assembly incorporating the invention.

FIG. 2 is an end elevational view of the embodiment of FIG. 1.

FIGS. 3A–3D are operational cross-sectional views taken along line 3—3 in FIG. 1.

FIG. 4 is a cross-sectional view of another embodiment of a photometric detector assembly incorporating the invention.

FIGS. 5A and 5B are operational cross-sectional views taken along line 5—5 in FIG. 4.

DETAILED DESCRIPTION

As illustrated in FIG. 1, the photometric detector assembly includes a housing 11 which consists of a circular base plate 12 and a cover 13 which is threadedly mounted on the base plate. The cover includes a cylindrical side wall 14 and an end wall 16. An O-ring 17 provides a seal between the base plate and the cover.

A measurement detector 19 is mounted on the base plate, and an optically transparent window 21 is mounted in end wall 16 in axial alignment with the measurement detector. An objective lens 22 directs a beam 23 passing through the window along an optical path 24 within the housing and focuses it on the detector. An optical filter 27 is positioned in front of the detector in a mounting block 28 which is bolted onto the base plate. The filter is retained in the mounting block by a set screw 29.

The mount 31 for objective lens 22 includes a mounting plate 32 which is affixed to mounting block 28 and separated from it by spacers 33. The mounting plate has an aperture 34 for the beam passing between the lens and the detector. The mount also includes a cylindrical barrel 36 which extends in a forward direction from the mounting plate, with a radial flange 37 at the outer end of the barrel. The lens is clamped between that flange and a cylindrical spacer 38 within the barrel, with an O-ring 39 between the outer end of the spacer and the lens.

A pair of NIST traceable calibration filters 41, 42 are mounted within the housing for movement into and out of optical path 24. These filters are standards whose calibration is part of an unbroken chain of comparison with standards maintained by the National Institute of Standards and Technology. They can be either neutral density filters or color filters, depending upon the application for which the detector is to be used. They are calibrated and certified to the measurement wavelength.

The calibration filters are mounted on pivot arms 43, 44 which consist of generally sector-shaped blades 46, 47 affixed to shafts 48, 49. The shafts are rotatively mounted in base plate 12 and mounting block 28 and pass through the base plate so they are accessible externally of the housing. The outer ends of the shafts have slots 51, 52 for rotation by a standard screwdriver.

Friction assemblies 53 and O-rings 54 are mounted on the shafts for holding the filters in the positions to which they are set, and thumbscrews 56, 57 engage the shafts to lock the filters in position. Alternatively, instead of being moved manually, the filters can be moved by pneumatic or electric operators connected to the pivot arm shafts.

The filters are movable between the normal operating position shown in FIG. 3A in which both filters are positioned out of the path of the beam and the calibration positions shown in FIGS. 3B–3D in which one or both of the filters are positioned in the beam path. When the filters are in the normal operating position, they are positioned out of the field of view of the measurement detector, and they are protected from optical radiation by lens mounting plate 32. In the calibration position, they are aligned with the aperture 34 in the lens mounting plate and with the detector.

The detector assembly is particularly suitable for use with an inline optical sensor of the type shown in U.S. Pat. No. 5,905,271, the disclosure of which is incorporated herein by reference. That sensor is particularly advantageous because it provides highly accurate vernier adjustments of the positions of the light source and detector windows on opposite sides of the chamber in which the product stream is monitored.

For purposes of illustrating the calibration procedure, it is assumed that filter 41 has an optical density of 0.5 OD and that filter 42 has an optical density of 1.0 OD. With a non-absorbing liquid in the sample chamber and both filters in their OUT positions, i.e. the normal operating position shown in FIG. 3A, an absorbance monitor connected to the detector is adjusted to give a reading of 0.00. With filter 41 rotated to its IN position and filter 42 in its OUT position, as illustrated in FIG. 3B, the monitor reading should be 0.5 OD. When filter 41 is rotated to its OUT position and filter 42 is rotated to its IN position, as shown in FIG. 3C, the monitor reading should be 1.0 OD. Finally, when both filters are rotated to their IN positions, as shown in FIG. 3D, the monitor will read the sum of the two filter densities, or 1.5 OD. This three point calibration procedure checks both accuracy and linearity of the optical system. The calibration can be done with the sensor inline, so it is not necessary to remove the sensor to calibrate it.

The embodiment illustrated in FIG. 4 is generally similar to the embodiment of FIG. 1, and like reference numerals designate corresponding elements in the two embodiments. The embodiment of FIG. 4 differs, however, in that it has only one calibration filter 41, it has a reference detector 59 in addition to measurement detector 19, and it has a beam splitter 61 instead of objective lens 22. The beam splitter is inclined at an angle of 45 degrees relative to the incoming beam. It divides the beam into two portions, one of which is directed along optical path 24 to the measurement detector, and the other of which is directed along path 62 to the reference detector. In one embodiment, the beam splitter transmits 50 percent of the impinging light to the measurement detector and reflects the other 50 percent to the reference detector. However, other combinations up to about 90 percent transmissive and 10 percent reflective can be used.

The beam splitter and reference filter are mounted on a mounting plate 63 which is affixed to mounting block 28 and separated from it by spacers 64. This mounting plate has an aperture 66 for the beam passing from the beam splitter to the measurement detector.

An optical filter 68 is positioned in front of the reference detector, and light passing from the beam splitter to the reference detector passes through an aperture 69.

In the normal operating position, calibration filter 41 is rotated to its OUT position as illustrated in FIG. 5A. In the calibration position, filter 41 is rotated to its IN position as shown in FIG. 5B, and it attenuates the measurement beam only. Because the absorbance of the filter is known to a high degree of accuracy, this establishes a precise optical relationship between the measurement beam and the reference beam, which is used for the photometric calibration of the sensor. If, for example, the filter has an optical density of 0.3 OD, then with the filter rotated to its IN position, the ratio of the optical density will increase by exactly 0.3 OD.

With proper selection of the beam splitter, the optical filters and the detectors, the sensor can be used over wide spectral ranges. With this type of sensor, a one point calibration is usually all that is needed. However, if a three point calibration is needed, a second calibration filter can be added as in the embodiment of FIG. 1.

The invention has a number of important features and advantages. It provides a high degree of calibration accuracy. Moreover, since the calibration filters are enclosed within a sealed housing and are exposed to the optical beam only on a limited basis, the filters do not have to be re-certified as often as they otherwise would.

It is apparent from the foregoing that a new and improved photometric detector assembly has been provided. While only certain presently preferred embodiments have been described in detail, as will be apparent to those familiar with the art, certain changes and modifications can be made without departing from the scope of the invention as defined by the following claims.

What is claimed is:

1. In a photometric detector assembly: a housing, means for passing an optical beam along a path through the housing to a detector, a filter enclosed within the housing, and means operable externally of the housing for moving the filter into and out of the beam path between calibration and normal operating positions without removing the filter from the housing.

2. The photometric detector assembly of claim 1 wherein the filter is a NIST traceable calibration standard.

3. The photometric detector assembly of claim 1 wherein the filter is mounted on a pivot arm for movement into and out of the beam path.

4. The photometric detector assembly of claim 1 including a second filter enclosed within the housing, and means for moving the second filter into and out of the beam path without removing the filter from the housing.

5. The photometric detector assembly of claim 1 wherein the means for passing the beam along the path includes a beam splitter which directs a first portion of the beam along the beam path and a second portion of the beam along a different path to a reference detector.

6. In a photometric detector assembly: a housing having a circular base plate and a cylindrical cover with an end wall facing the base plate, a detector mounted on the base plate, a window in the end wall in axial alignment with the detector, an optical path extending through the housing between the window and the detector, and a calibration filter mounted on a pivot arm having a shaft which extends through the base plate and is operable externally of the housing for moving the filter into and out of the optical path without removing the filter from the housing.

7. The photometric detector assembly of claim 6 wherein the filter is a NIST traceable calibration standard.

8. The photometric detector assembly of claim 6 including a second calibration filter mounted on a second pivot arm which extends through the base plate and is operable externally of the housing.

9. The photometric detector assembly of claim 6 including a beam splitter positioned between the window and the detector for directing a first portion of the beam along the optical path and a second portion of the beam along a different path to a reference detector.

10. In a photometric detector assembly: a housing, a detector mounted in the housing, a window in the housing, an objective lens mounted within the housing near the window for directing an optical beam along a path to the detector, and first and second calibration filters mounted on pivot arms with shafts which are accessible externally of the housing for moving the filters into and out of the beam path.

11. The photometric detector assembly of claim 10 wherein the filters are NIST traceable calibration standards.

12. The photometric detector assembly of claim 10 wherein the housing comprises a base plate and a cover, and the pivot arm shafts pass through the base plate.

13. In a photometric detector assembly: a housing, measurement and reference detectors mounted in the housing, a window in the housing, a beam splitter mounted within the housing for splitting an optical beam passing through the window into two separate beams which are directed along first and second optical paths to the measurement and reference detectors respectively, a calibration filter enclosed within the housing, and means operable externally of the housing for moving the calibration filter into and out of the first path between calibration and normal operating positions without removing the filter from the housing.

14. The photometric detector assembly of claim 13 wherein the filter is a NIST traceable calibration standard.

15. The photometric detector assembly of claim 13 wherein the housing includes a base plate and a cover, and the calibration filter is mounted on a pivot arm having an operating shaft which passes through the base plate.

* * * * *